Figure 1:
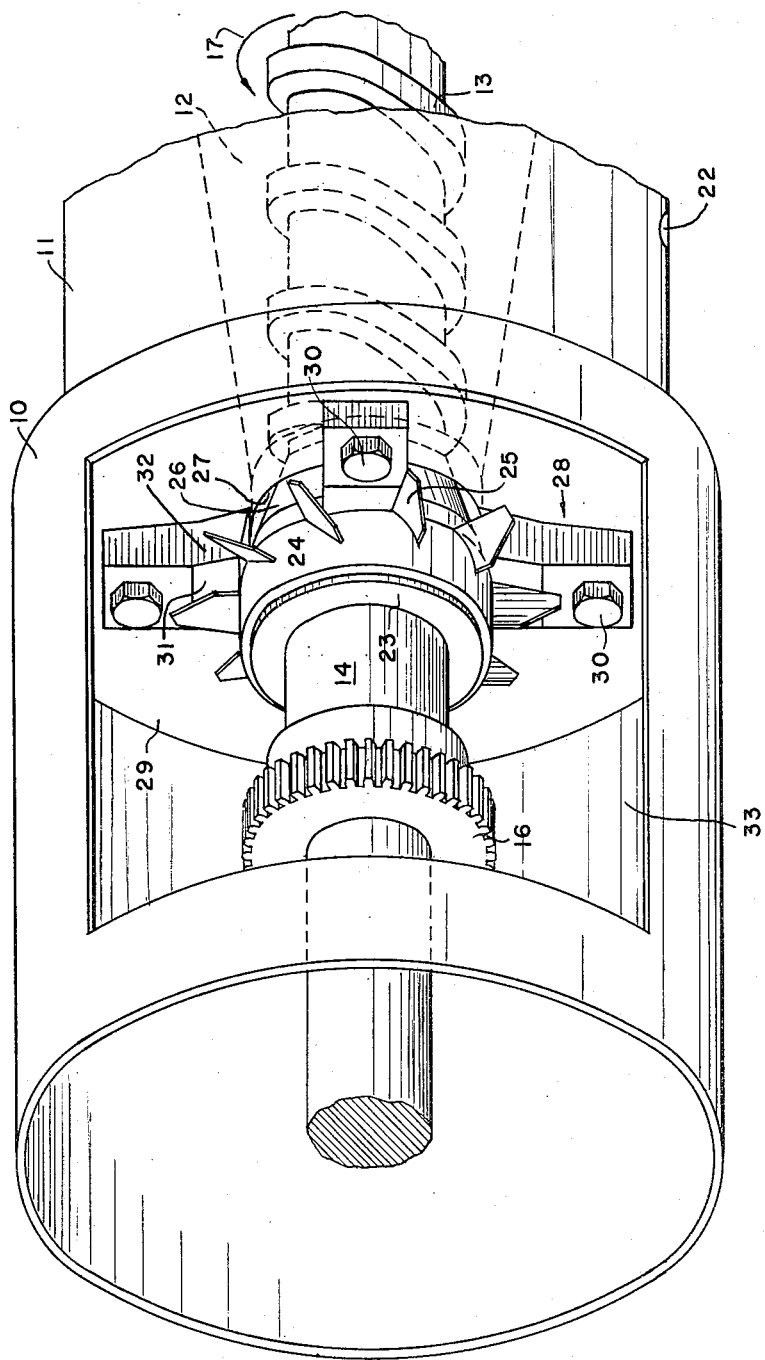

INVENTORS:
JOHN K. R. SEAL
PHILIP A. JOHNSON
BY: *Oswald H. Wilmore*
THEIR ATTORNEY United States Patent Office 2,994,105
Patented Aug. 1, 1961

2,994,105
SCREW PRESS AND METHOD OF TREATING MATERIAL
John K. R. Seal, Sale, and Philip A. Johnson, Timperley, England, assignors to Shell Oil Company, New York, N.Y., a corporation of Delaware
Filed Dec. 24, 1959, Ser. No. 861,950
Claims priority, application Great Britain Jan. 1, 1959
10 Claims. (Cl. 18—12)

The invention relates to the treatment of solid material, such as thermoplastic particles, and is particularly but not exclusively applicable to the treatment of polyethylene and polypropylene, which are obtained in a manner known per se by polymerizing the monomeric alkylene in the presence of an organo-metal catalyst under low pressure. The term "polymers" as used herein also includes copolymers.

More particularly, the invention relates to improvements in a screw press which is provided with a worm screw operating within a barrel for compacting particulate material and discharging it through a solids outlet, and which is usually provided with separate liquid-discharge passages in the barrel for discharging liquid expelled from the particulate matter, and to a method for treating wetted thermoplastic material in such a press.

Polymerization reactions for the production of polyethylene and polypropylene are generally carried out at pressures below 500 atmospheres, depending upon the type of catalyst used; it is even possible to carry out the reaction at normal pressure. Suitable catalysts for such low-pressure polymerizations (sometimes referred to as the "Ziegler" process) have been described in Belgian Patents Numbers 533,362, 534,792 and 534,888 and in German Patents Numbers 878,560, 889,229, 883,067 and 874,215.

The polymer formed in such low-pressure polymerizations generally separates in the form of a finely divided mass contaminated with coprecipitated catalyst. The catalyst is then usually removed by decomposition with an alcohol, water, or an acid. The decomposition is preferably effected by using alcohols, such as methyl alcohol or ethyl alcohol, after which the polymer is freed by washing it by water from the catalyst-decomposition products. The wet polymer is then dried.

It is the broad object of this invention to provide a screw press suitable for compacting solid materials, including thermoplastic polymers, and producing directly small pieces or chunks of the solid without destroying its particulate form by grinding. An additional and more specific object is to provide a screw press and process for expelling the liquid from particulate solid material, particularly aqueous thermoplastic polymer as described above, and produce the said small pieces of the solid material in the same operation.

It has already been found that the expulsion of liquid from particulate solids can be achieved by passing the latter through an expeller of the type used for expelling oil from vegetable material, usually known as an oil expeller. It is further known that such known oil expellers can produce small pieces of the compacted solids. Among the elements of such an expeller are a barrel enclosing a chamber, usually of generally conical shape and having a substantially circular discharge orifice at the apex, the chamber walls being formed with passages or grooves, through which the expelled liquid can drain off, a shaft extending axially through this chamber and through and beyond the orifice to form an annular extrusion passage, a feed screw or worm mounted on this shaft within the barrel chamber, and a disintegrating device or devices, e.g., radially disposed blades, carried by the shaft outside of the barrel but near the orifice. In some instances liquid-discharge passages are formed in the worm in addition to or in lieu of those in the chamber wall. The feed screw or worm mechanically works and feeds the material toward the apex of the conical chamber and the restricted outlet passage imposes a back pressure, thereby compacting or compressing the solids to expel the liquid, e.g., oil, and forces or extrudes the solid material, e.g., the vegetable material, through the extrusion passage; just beyond the latter the material impinges on the disintegrating devices and is converted from a compacted mass into a friable, particulate consistency which can be easily fed to containers. A liquid expeller functions in the same manner to expel aqueous liquid from wet particulate, thermoplastic material. However, with the latter material, and especially in the case of polyethylene, a liquid expeller of the known type is not always satisfactory because the passage of the material through the expeller sometimes generates sufficient heat to soften or melt a part of the solid material, with the result that there is a tendency to form a continuous strip or strips of thermoplastic material instead of merely a compacted mass of particles. Continuous strips of fused material are not satisfactorily disintegrated by known disintegrating devices although these devices suffice to break up compacted particulate polymer which has not been appreciably fused, with the result that strips of the fused thermoplastic material become mixed with the disintegrated material and impede the carrying out of subsequent working-up operations and, additionally or alternatively, remain near the expeller shaft and impede the functioning of the expeller itself.

It has now, in accordance with this invention, been found that these disadvantages can be avoided and adequate disintegration of any fused polymer can be achieved, by providing, in addition to the known or usual disintegrating devices carried by the expeller shaft, one or more elements which are mounted for cooperation with the said devices in such a way that there is relative motion between the disintegrating devices and the said elements and one moves in such close relation to the other that the extruded material is held by the said elements while the disintegrating device cuts the material. Because the said elements perform anvil-like function they will be called anvils.

Thus, in accordance with the invention, a known screw press or expeller having a disintegrating device, e. g., in the form of a star rotor, can be modified by the provision of one or more circumferentially spaced cooperating anvils, e.g., fashioned as metal bars, which is or are situated adjacently to the blades of the disintegrating device to be swept thereby. Preferably a plurality of the said anvils is provided and they extend generally radially outward from the shaft axis and have anvil faces directed toward the approaching blades of the rotating disintegrating device. The anvils are swept by the disintegrating device with small clearance.

The present invention also provides a process whereby particulate thermoplastic material is separated from adherent and/or admixed liquid by passing it through a liquid expeller, which has been modified by adding the anvils, as indicated above.

Polyvinyl chloride is another example of thermoplastic materials which may be treated by the process of the present invention.

The disintegrating effect of the said anvil used in accordance with the invention is primarily achieved by the fact that it forms a support against which any strips of fused material can be cut by the disintegrating device. The optimum relative positions of the said anvil and device with respect to each other is determined by this cutting action. The clearance between them will vary somewhat in different applications in accordance with the mechanical properties of the thermoplastic material. The positions of the disintegrating device and anvil can be reversed, i.e., the rotatable shaft may have motion relative to the former and the latter can be carried by the shaft, but this arrangement is not generally convenient since it involves further modification to existing and commercially available liquid expellers.

Preferably the anvils are four in number and are narrow, more or less radial metal bars arranged symmetrically about the orifice of the expeller barrel so as to leave large open sectors between anvils.

Figure 2:
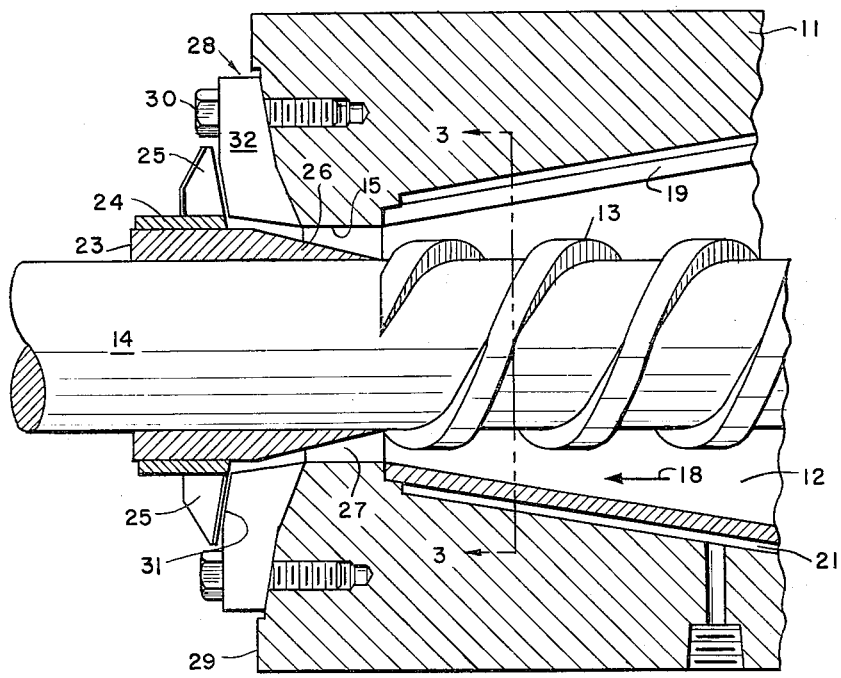
Figure 3:
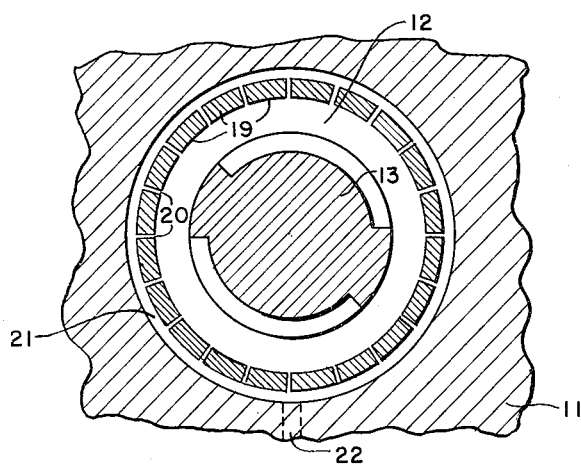

The invention will be further described with reference to the accompanying drawing forming a part of this specification and showing one preferred embodiment of the expeller, wherein:

FIGURE 1 is a perspective view of a part of a liquid expeller with the cover plate removed, FIGURE 2 is a longitudinal sectional view of a part of the expeller; and FIGURE 3 is a transverse sectional view taken on the line 3—3 of FIGURE 2.

Referring to the drawings in detail, the expeller comprises a main, ported housing 10 the rear end of which surrounds the front of a barrel 11 which defines a conical chamber 12 containing a feed worm 13 in the form of a screw. The thread on the worm need not be continuous but may have smooth portions at intervals along its length. It will be understood that the barrel has an inlet for the wet material; this and the rear portion of the barrel are not shown because they are well known. The feed worm is fast to or integral with a shaft 14 which passes through an orifice 15 at the apex of the conical barrel and extends beyond the orifice. It carries a gear 16 by means of which the shaft and worm are rotated by a meshing drive gear, not shown. The direction of rotation of the shaft and worm are shown by the arrow 17 (FIGURE 1) and the direction of flow of material, toward the front, by the arrow 18 (FIGURE 2). The wall of the barrel chamber 1 has pasages for leading off expelled liquid. For example, this chamber may be bounded by a plurality of longitudinal bars 19 which leave narrow slots 20 through which such liquid can enter a collection chamber 21 for discharge through a passageway 22.

The shaft 14 carries fast thereto a tapered sleeve 23 and a collar 24 on which are fixed a number of disintegrating devices 25, shown embodied as cutter blades which are inclined with respect to the plane normal to the shaft axis in the screw direction of forward flow of material when the shaft rotates as indicated by the arrow 17. The part 26 of the sleeve 23 which is within the orifice 15 is tapered toward the rear to define therewith an annular extrusion passage 27 which becomes narrower toward the front.

Four disintegrating anvils 28 are attached to the front end face 29 of the barrel by bolts 30. They are narrow metal bars the inner ends of which lie in the extension of the orifice wall and spaced radially with small clearance from the tapered part 26 of the sleeve, as shown in FIGURE 2; they have front faces 31 which are advantageously inclined forwardly and outwardly, so as to be situated approximately in the plane of a wide-angle cone. The rear edges of the blades 25 are contoured to conform closely to these front faces and are closely adjacent thereto to sweep the faces with a small clearance. The anvils extend forward from the barrel a sufficient distance to present lateral anvil faces 32 directed toward the approaching blades. Because of above-described inclination of the blades in the screw direction the strips of solid material which issue from the extrusion passage are supported, or held up to the cutter blades 25 by the anvils and thus easily cut by the blades.

The housing 10 has large ports 33 through which the disintegrated solid material can escape by gravity.

In operation, the shaft 14 is driven by the gear 16 at a suitable speed, e.g., 9–27 revolutions per minute, preferably between 16 and 19. Wet particulate solids, such as water-bearing thermoplastic material, is forced through the chamber 12 by means of the feed worm 13 while being worked and subjected to gradually increasing pressure. This pressure is insured by the back pressure created by the forward taper of the chamber forwardly converging discharge passage 27. During this movement the liquid is expelled from the particulate material and escapes through the slots 20 into the chamber 21, for discharge through the passage 22. The compacted material is extruded through the discharge passage 27 and is engaged by the disintegrating or cutter blades 25. It is readily cut by the latter because it is held in cutting position by the anvils 28. Some of the extruded solid material which has been only partly compacted and not melted is primarily disintegrated by the blades alone, although this is also assisted by the anvils.

The conical shape of the sleeve part 26 permits the width of the discharge passage 27 to be varied by shifting the axial position of the sleeve to control the back pressure.

This influences the extent to which liquid is expelled. For example, starting with a feed material containing 45% of aqueous liquid, the extruded material will contain only about 2–10% of liquid. Increase in temperature, increase in pressure, and increase in the period that the thermoplastic material is compressed all have a favorable effect in producing an extruded product of high bulk density and low moisture content. An increase in the pressure leads to an increase in the temperature as a result of increased friction. In order to govern the final temperature the thermoplastic material may be preheated or cooled to a specific temperature prior to being fed into the expeller. Due to the melting of part of the thermoplastic material in prior devices, such elevated temperatures were not feasible in prior devices, in that the cutter blades could not disintegrate the material and long string-like filaments of material were produced. This difficulty is obviated by the invention.

We claim as our invention:

1. In a screw press for compacting solid material, the combination of a feed worm in screw form, a barrel for said worm provided with a discharge orifice, means at said orifice developing back pressure to effect compaction of solid material before discharge, and a disintegrator for discharged material situated adjacently to and beyond said orifice, said disintegrator comprising a pair of relatively rotatable elements positioned so that one sweeps the other and each said element having an unobstructed space situated circumferentially adjacent thereto so that discharged material can be held by one element and cut by the other.

2. A combination as defined in claim 1 wherein one of said disintegrator elements comprises a plurality of cutter blades and the other at least one anvil, said anvil extending outward from the orifice axis starting in close proximity to the orifice wall and being formed with circumferentially directed anvil faces, and said blades being situated to sweep said anvils in close relation.

3. A combination as defined in claim 2 wherein said blades are inclined with respect to the plane normal to the axis of rotation in the screw direction to assist movement of discharged material away from the orifice.

4. A combination as defined in claim 1 wherein said barrel has liquid-discharge passages for liquid expelled from said solid material during compaction thereof.

5. In a screw press for expelling liquid from and compacting thermoplastic wet material, the combination of a feed worm in screw form, a barrel for said worm having a chamber and providing at the front a discharge orifice at one end, the wall of said barrel having liquid-discharge passages, a shaft fast to said worm extending through said orifice, means for rotating the shaft in a direction to prove material within the chamber to the orifice, said orifice and shaft having contours to define an annular discharge passage for compacted material which becomes thinner toward the front to impose a back pressure on the material within the chamber, a plurality of circumferentially spaced cutter blades fixed to the shaft in front of and near to said barrel, and at least one anvil fixed to the front of said barrel and extending outwardly from the shaft axis from the immediate vicinity of said annular discharge passage, said anvil having a face directed circumferentially opposite to the direction of shaft rotation and said blades being positioned to overlap the anvil radially and sweep it in close proximity.

6. A combination as defined in claim 5 wherein said blades are inclined with respect to the plane normal to the shaft axis in the screw direction to assist movement of the discharged material away from the orifice.

7. A process for treated wet particulate thermoplastic material which comprises passing it through a liquid expeller wherein the material is compressed and liquid is expelled, discharging the compacted material continuously from the expeller as a continuous filament which is peripherally unconfined throughout a major part of the filament perimeter, passing the discharged filament in the close vicinity of its point of discharge outwards from the filament axis between disintegrating elements which move relatively to one another in closely spaced relation and thereby cutting the filament into sections without substantially destroying its particulate form.

8. A process according to claim 7 wherein said material is discharged as an annular filament.

9. A process according to claim 7 wherein said disintegrating elements have relative rotation at a speed between 9 and 27 revolutions per minute.

10. A process according to claim 7 wherein said wet material is aqueous, finely divided polyethylene.

References Cited in the file of this patent

UNITED STATES PATENTS

| | | |
|---|---|---|
| 651,722 | Murphy | June 12, 1900 |
| 731,736 | Anderson | June 23, 1903 |
| 808,193 | Bussells | Dec. 26, 1905 |
| 1,102,301 | Sizer | July 7, 1914 |
| 1,902,738 | Tuttle | Mar. 21, 1933 |
| 2,216,658 | Anderson | Oct. 1, 1940 |
| 2,257,067 | Parsons | Sept. 23, 1941 |
| 2,371,722 | Wanderer | Mar. 20, 1945 |
| 2,401,236 | Fielitz | May 28, 1946 |
| 2,547,151 | Braeseke | Apr. 3, 1951 |
| 2,705,916 | Millgard | Apr. 12, 1955 |